US007957970B1

(12) United States Patent
Gorin et al.

(10) Patent No.: US 7,957,970 B1
(45) Date of Patent: Jun. 7, 2011

(54) METHOD AND SYSTEM FOR PREDICTING PROBLEMATIC SITUATIONS IN AUTOMATED DIALOG

(75) Inventors: Allen Louis Gorin, Berkeley Heights, NJ (US); Irene Langkilde Geary, Los Angeles, CA (US); Diane Judith Litman, Maplewood, NJ (US); Marilyn Ann Walker, Morristown, NJ (US); Jeremy H. Wright, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 621 days.

(21) Appl. No.: 11/562,080

(22) Filed: Nov. 21, 2006

Related U.S. Application Data

(63) Continuation of application No. 09/712,192, filed on Nov. 15, 2000, now Pat. No. 7,158,935.

(51) Int. Cl.
*G10L 15/22* (2006.01)
*G10L 21/00* (2006.01)

(52) U.S. Cl. ......................... 704/257; 704/251; 704/270

(58) Field of Classification Search .................. 704/251, 704/255, 257, 270, 270.1, 275
See application file for complete search history.

(56) References Cited

U.S. PATENT DOCUMENTS

| | | | |
|---|---|---|---|
| 4,777,600 A | 10/1988 | Saito et al. | |
| 4,866,778 A | 9/1989 | Baker | |
| 4,903,305 A | 2/1990 | Gillick et al. | |
| 5,029,214 A | 7/1991 | Hollander | |
| 5,033,088 A | 7/1991 | Shipman | |
| 5,099,425 A | 3/1992 | Yuji et al. | |
| 5,384,892 A | 1/1995 | Strong | |
| 5,390,272 A | 2/1995 | Repta et al. | |
| 5,434,906 A | 7/1995 | Robinson et al. | |
| 5,457,768 A | 10/1995 | Tsuboi et al. | |
| 5,666,400 A | 9/1997 | McAllister et al. | |
| 5,675,707 A * | 10/1997 | Gorin et al. ................... 704/257 |
| 5,719,921 A | 2/1998 | Vysotsky et al. | |

(Continued)

OTHER PUBLICATIONS

Pending U.S. Appl. No. 09/699,494, Gorin et al.

(Continued)

*Primary Examiner* — Angela A Armstrong

(57) ABSTRACT

The invention concerns a system and method of predicting problematic dialogs in an automated dialog system based on the user's input communications. The method may include determining whether a probability of conducting a successful dialog with the user exceeds a first threshold. The successful dialog may be defined as a dialog exchange between an automated dialog system and the user that results in at least one of processing of the user's input communication and routing the user's input communication. The method may further operate such that if the first threshold is exceeded, further dialog is conducted with the user. Otherwise, the user may be directed to a human for assistance. In another possible embodiment, the method operates as above except that if the probability exceeds a second threshold, the second threshold being higher than the first, then further dialog is conducted with the user using the current dialog strategy. However, if the probability falls between a first threshold and a second threshold, the dialog strategy may be adapted in order to improve the chances of conducting a successful dialog with the user. This process may be cumulative. In particular, the first dialog exchange may be stored in a database. Then, a second dialog exchange is conducted with the user. As a result, a second determination is made as to whether successful dialog can be conducted based on the stored first exchange and the current second exchanges. This cumulative process may continue using a third and fourth exchange, if necessary.

22 Claims, 7 Drawing Sheets

U.S. PATENT DOCUMENTS

| | | | |
|---|---|---|---|
| 5,794,193 A | 8/1998 | Gorin | |
| 5,839,106 A | 11/1998 | Bellegarda | |
| 5,860,063 A | 1/1999 | Gorin et al. | |
| 5,905,774 A | 5/1999 | Tatchell et al. | |
| 6,021,384 A | 2/2000 | Gorin et al. | |
| 6,023,673 A | 2/2000 | Bakis et al. | |
| 6,044,337 A | 3/2000 | Gorin et al. | |
| 6,088,731 A * | 7/2000 | Kiraly et al. | 709/229 |
| 6,173,261 B1 | 1/2001 | Arai et al. | |
| 6,192,110 B1 | 2/2001 | Abella et al. | |
| 6,236,968 B1 | 5/2001 | Kanevsky et al. | |
| 6,421,655 B1 | 7/2002 | Horvitz et al. | |
| 6,490,698 B1 | 12/2002 | Horvitz et al. | |
| 6,681,206 B1 | 1/2004 | Gorin et al. | |
| 6,751,591 B1 * | 6/2004 | Gorin et al. | 704/257 |
| 6,941,266 B1 * | 9/2005 | Gorin et al. | 704/257 |
| 7,003,459 B1 * | 2/2006 | Gorin et al. | 704/240 |
| 7,085,720 B1 | 8/2006 | Gorin et al. | |
| 7,127,395 B1 * | 10/2006 | Gorin et al. | 704/257 |
| 7,158,935 B1 * | 1/2007 | Gorin et al. | 704/257 |
| 7,440,893 B1 * | 10/2008 | Gorin et al. | 704/240 |
| 7,590,224 B1 | 9/2009 | Gorin et al. | |

OTHER PUBLICATIONS

Pending U.S. Appl. No. 09/699,496, Abella et al.

Langkilde, et al. "Automatic Prediction of Problematic Human-Computer Dialogues in How May I Help You", AT&T Labs, Research, Florham Park, NJ, Dec. 12, 1999.

Litman et al. "Automatic Detection of Poor Speech Recognition at the Dialogue Level", Proceedings of the 37$^{th}$ Annual Meeting of the Association of Computational Lingustics, ACL99, Jun. 1999, pp. 309-316.

Stolcke et al., "Dialogue Act Modeling for Automatic Tagging and Recognition of Conversational Speech", Association for Computational Linguistics, Sep. 2000, pp. 339-373.

Janssen et al. "Generating User Interfaces from Data Models and Dialogue Net Specifications", Proceedings of the SIGCHI Conference on Human Factors in Computing Systems, Apr. 24-29, 1993, pp. 418-423.

Shriberg et al. "Can Prosody Aid the Automatic Classification of Dialog Acts in Conversational Speech?" Language and Speech 41(3-4), Special Issue on Prosody and Conversation, 1998, pp. 439-487.

* cited by examiner

| FEATURES USED | ACCURACY | (SE) |
|---|---|---|
| BASELINE (MAJORITY CLASS) | 64.0% | |
| EXCHANGE 1                AUTOMATIC<br>AUTO, TASK-INDEP<br>ALL | 72.3%<br>71.6%<br>77.0% | 1.04%<br>1.05%<br>0.56% |
| EXCHANGES 1&2             AUTOMATIC<br>AUTO, TASK-INDEP<br>ALL | 79.9%<br>78.6%<br>86.7% | 0.58%<br>0.37%<br>0.33% |
| FULL DIALOGUE             AUTOMATIC<br>AUTO, TASK-INDEP<br>TOPLINE                         ALL | 87.0%<br>86.7%<br>92.3% | 0.72%<br>0.82%<br>0.72% |

METHOD AND SYSTEM FOR PREDICTING PROBLEMATIC SITUATIONS IN AUTOMATED DIALOG

The present application is a continuation of U.S. patent application Ser. No. 09/712,192, filed Oct. 15, 2000, which all contents is incorporated by reference herein in its entirety

TECHNICAL FIELD

The invention relates to automated systems for communication recognition and understanding.

BACKGROUND OF THE INVENTION

In operating customer care systems, conventional methods for automated recognition and understanding of user's input communications often include the implementation of a dialog manager to interact with the user. Examples of such methods are shown in U.S. Pat. Nos. 5,675,707, 5,860,063 and 6,044,337, and U.S. patent application Ser. No. 08/943,944, filed Oct. 3, 1997, Ser. No. 09/217,635, filed Dec. 21, 1998, Ser. No. 09/690,721 and Ser. No. 09/690,903 both filed Oct. 18, 2000, and Ser. Nos. 09/699,494, 09/699,495, and 09/699,496 all filed Oct. 31, 2000, each of which is incorporated by reference herein in its entirety.

These dialog systems promise efficient and natural access to a large variety of information sources and services from any communication device. Systems that support short restricted utterances to select a particular function (responding to a prompt such as "Say credit card, collect or person-to-person") are saving companies millions of dollars in customer care costs.

However, current systems are limited in the interaction they support and brittle in many respects. For example, current spoken dialog systems are quite limited in their strategies for detecting and repairing problems that arise in conversation.

SUMMARY OF THE INVENTION

The invention concerns a system and method of predicting problematic dialogs in an automated dialog system based on the user's input communications. The method may include determining whether a probability of conducting a successful dialog with the user exceeds a first threshold. The successful dialog may be defined as a dialog exchange between an automated dialog system and the user that results in at least one of processing of the user's input communication and routing the user's input communication. The method may further operate such that if the first threshold is exceeded, further dialog is conducted with the user. Otherwise, the user may be directed to a human for assistance.

In another possible embodiment, the method operates as above except that if the probability exceeds a second threshold, the second threshold being higher than the first, then further dialog is conducted with the user using the current dialog strategy. However, if the probability falls between a first threshold and a second threshold, the dialog strategy may be adapted in order to improve the chances of conducting a successful dialog with the user.

This process may be cumulative. In particular, the first dialog exchange may be stored in a database. Then, a second dialog exchange is conducted with the user. As a result, a second determination is made as whether successful dialog can be conducted based on the stored first exchange and the current second exchanges. This cumulative process may continue using a third and fourth exchange, if necessary.

BRIEF DESCRIPTION OF THE DRAWINGS

The invention is described in detail with reference to the following drawings wherein like numerals reference like elements, and wherein:

FIG. 7 is a chart illustrating the results for predicting and identifying problematic dialogs.

DETAILED DESCRIPTION OF THE PREFERRED EMBODIMENTS

The invention concerns learning to automatically identify and predict problematic human-computer dialogs. The ability to predict problematic dialogs will allow an automated system's dialog manager to modify its behavior to repair dialog problems, and even perhaps, to prevent them. As such, this invention may be applied to any single mode, or multimodal, dialog system. The invention involves a system that learns to automatically predict that a dialog will be problematic on the basis of information that the system has early on in the dialog and in real time. In this regard, the dialog predictor of the invention predicts that a dialog will be problematic based on the first (or first few) dialog exchanges, wherein the dialog predictor predicts if the dialog will 'converge/succeed' or 'diverge/fail'. The decision rules and the features upon which the dialog predictor makes such decisions, may be trained from a stored database (corpus) of such dialogs tagged with success/failure.

This invention may apply to any automated recognition and understanding system that receives communications from external sources, such as users, customers, service providers, associates, etc. Consequently, the method may operate in conjunction with one or more communication networks, including a telephone network, the Internet, an intranet, Cable TV network, a local area network (LAN), a wireless communication network, etc.

The communications received over the networks may be verbal, nonverbal, multimodal, etc. Examples of nonverbal communications include the use of gestures, body movements, head movements, non-responses, text, keyboard entries, keypad entries, mouse clicks, DTMF codes, pointers, stylus, cable set-top box entries, graphical user interface entries, touchscreen entries, etc. Multimodal communications involve communications on a plurality of channels, such as aural, visual, etc. However, for ease of discussion, the method and system of the invention are discussed below in relation to telephone systems.

Figure 1:
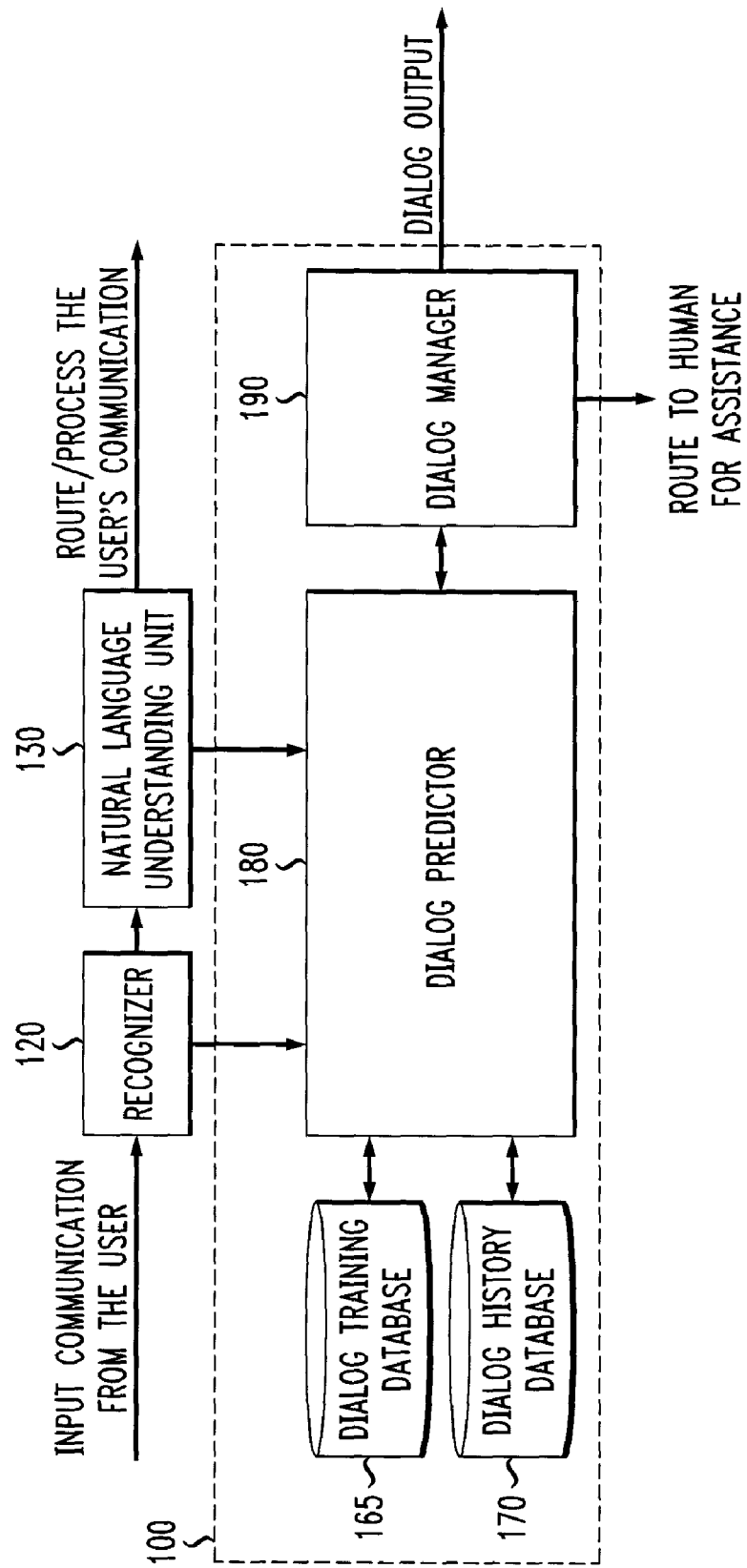
FIG. 1 is a block diagram of an exemplary dialog prediction system.

FIG. 1 illustrates an exemplary automated problematic dialog prediction system 100. The automated problematic dialog prediction system 100 includes a dialog predictor 180, a dialog manager 190, a dialog training database 165 and a dialog history database 170. The dialog predictor 180 receives recognition data from a recognizer 120 and understanding data from a natural language understanding unit (NLU) 130 that are based on input communications from the user.

The recognizer 120 and the NLU 130 are shown as separate units for clarification purposes. However, the functions of the recognizer 120 and the NLU 130 may be performed by a single unit within the spirit and scope of this invention.

The recognizer 120 and the natural language understanding unit 130 may operate using one or more of a variety of recognition and understanding algorithms. For example, the recognizer 120 and the NLU 130 may use confidence functions to determine whether the users input communications has been recognized and understood.

As a result, if the users input communication can be satisfactorily recognized and understood, the NLU 130 routes and/or processes the users input communication, which may include the request, comment, etc. However, if the users input communication cannot be satisfactorily recognized and understood, dialog with the user may need to be conducted. The recognition and understanding data from the users input communication are then input into the dialog predictor 180 of the automated problematic dialog prediction system 100 to determine if a successful dialog can be achieved. This process will be described in greater detail below.

In the automated dialog prediction system 100, the dialog history database 170 serves as a database for storing each dialog exchange for a particular dialog. The dialog training database 165 stores dialogs collected in interactions with human users, the features identified from the collected dialogs, and the dialog rules generated from the dialogs and the dialog features. The dialog predictor 180 exploits the dialog training database 165 by using the dialog history stored in the dialog history database 170 to predict whether a problematic dialog is to occur in the current dialog. While the dialog training database 165 and the dialog history database 170 are shown as separate databases in the exemplary embodiments, the dialog history and dialog training data may be stored in the same database or memory, for example.

As discussed below, the dialog predictor 180 of the dialog prediction system 100 can be trained to improve its ability to detect problems by exploiting dialogs collected in interactions with human users and stored in the dialog training database 165. The initial segments of these dialogs can be used to predict that a problem is likely to occur. The ability to predict that a dialog is likely to be problematic will allow the system's dialog manager 190 to apply more sophisticated strategies to repairing problems, and even perhaps, to prevent them.

Note that the recognizer may be trained to recognize any number of communication symbols, both acoustic and non-acoustic, including grammar fragments, meaningful words, meaningful phrases, meaningful phrase clusters, superwords, morphemes, multimodal signals, etc., using any of the methods known to one skilled in the art including those found in U.S. Pat. Nos. 5,675,707, 5,860,063 and 6,044,337, and U.S. patent application Ser. No. 08/943,944, as discussed above.

An example of a dialog that the dialog manager 190 completed successfully, is shown below:
 SI: AT&T How may I help you?
 U1: I need to [uh] put a call on my calling card please
 S2: May I have your card number, please?
 U2: 7 6 5 4 3 2 1 0 9 8 7 6 5 4
 S3: What number would you like to call?
 U3: 8 1 4 7 7 7 6 6 6 6 (misrecognized)
 S4: May I have that number again? U4: 814 7 7 7 6 6 6 6
 S5: Thank you.

This outcome is an example of a TASKSUCCESS dialog in which the automated dialog prediction system 100 successfully automates the customer's call. However, in addition to the TASKSUCCESS dialogs in which the system 100 successfully automates the customer's call, and the calls that the dialog manager 190 transfers to a human operator, there are three other possible outcomes for a call, all of which are problematic. The first category, which is termed HANGUP, results from a customer's decision to hang up on the system. In a HANGUP scenario, a caller may hang up because he or she is frustrated with the system 100. The goal of the dialog system is to learn from the corpus which system behaviors led to the caller's frustration. A sample HANGUP dialog is shown below:
 SI: AT&T How may I help you?
 UI: I need credit please.
 52: Okay. What is the reason for the credit?
 U2: Miss, uh, Miss, different area code than I needed.
 S3: Sorry. I need to know whether you need credit for a wrong number, bad connection or a call that was cut off.
 U3: It is a wrong number. (impatient humming)
 S4: What was the number that you dialed? USER HANGS UP The second problematic category (WIZARD) results from a human agent's decision to take over the call from the system 100 if he or she perceived problems with the system's performance. The wizard's decision was logged by the experimental setup, resulting in labeling the call as one that the wizard took over. An exemplary dialog where the wizard decided that the dialog was problematic and took over the call is shown below:
 SI: AT&T How may I help you? UI: (silence)
 82: Sorry. Please briefly tell me how I may help you?
 U2: I'm trying to call I 8 hundred call A T T.
 S3: Do you want to place a call?
 U3: Through my calling card.
 S4: May I have your card number, please?
 U4: It's 8765432 10 and then my pin Dumber is 8 7 6 5. (misrecognized)
 S5: Sorry. Please enter or say your card number again. WIZARD STEPS IN The third problematic category, the TASKFAILURE dialogs, are cases where the system completed the call, but carried out a task that was not the task that the customer was actually requesting. An example TASKFAILURE dialog is given below:
 SI: AT&T How may I help you?
 UI: (silence)
 S2: Sorry. Please briefly tell me how 1 may help you?
 U2: I wanta find out how much my bill's worth.
 S3: What phone number would you like the call billed to?
 U3: Urn the access number.
 S4: Sorry. Could I have that phone number again?
 U4: 1 8 hundred 2 2 5 5 2 8 8.
 S5: What number would you like to call?
 U5: 800 225 5288 (touchtone input)
 S6: Thank you.

In the example, the system 100 interpreted utterance U2 as a request to make a third-party call e.g. to bill it to my home phone. The system 100 then asked the caller for the information it needed to carry out this task, the caller complied, and the system completed the call.

The invention discussed herein attempts to predict, for example, by the end of U2 that the dialog above is problematic. In one exemplary embodiment, the system's dialog manager adapts its dialog strategy as a result of detecting that the probability of a successful dialog exceeds a predetermined (P(success)<t), after user utterance U2. An example of such adaptation is given below in a modified version of the above dialog. Given the prediction of a problematic dialog after utterance U2, the system adapts its dialogue strategy to use EXPLICIT CONFIRMATION as shown in S3'. This strategy requests the user to explicitly confirm the task classification that the system has chosen. But in this case the system was wrong and the user responds No.

S1: AT&T How may I help you?
U1: (silence)
S2: Sorry. Please briefly tell me how I may help you?
U2: I wanta find out how much my hill's worth.
SYSTEM SWITCHES DIALOGUE STRATEGY
S3': Do you want to make a call and bill it to another number?
(EXPLICIT CONFIRMATION DIALOGUE STRATEGY)
U3' No.
S4': Sorry that was my fault. Did you say you would like to check the status of your bill?
S4" Sorry, my fault. Do you want to make a call, check the status of your bill, or access other information?

After U3', the system 100 has several options for adapting its dialog strategy, any one of which might increase the probability of a successful dialog. For example, if there are other candidates for the task classification that are fairly highly ranked, the dialog manager 190 could ask the user to specify which one of the candidates he or she is trying to request as in S4'.

Alternatively, the dialog manager 190 could re-prompt the user at the top level but more simplistically or directively. For example, by using the first level of the task hierarchy, with a multiple choice question as in the strategy embodied by S4". Thus, the main point of this dialog mode is that by triggering a more conservative strategy at U2, involving explicit confirmation, multiple choice questions and directive prompts, we increase the likelihood of avoiding task failure.

The large corpus of 4774 dialogs was collected in several experimental trials on live customer traffic, and is referred to as HM2. During the trial, all of the system 100 behaviors were automatically recorded in a log file, and later the dialogs were transcribed by humans and labeled with a semantic category representing the task that the caller was asking the system 100 to perform, on a per utterance basis. The log files also included labels indicating whether the wizard had taken over the call or the user had hung up.

In training the dialog predictor 180, any type of automatic classification algorithm can be applied to automatically induce a "problematic dialog" classification model. For example, the dialog predictor may be trained using a rule induction method, or any other method known to those skilled in the art. The automatic classifier takes as input the names of a set of classes to be learned, the names and ranges of values of a fixed set of features, and training data specifying the class and feature values for each example in a training set. The automatic classifier's output is a classification model for predicting the class of future examples and is stored in the dialog training database 165. The classification model in the embodiment discussed herein is learned using a greedy search guided by an information gain metric, and expressed as an ordered set of if-then rules, for example. To apply this classification model, the dialogs in the corpus must be encoded in terms of a set of classes (the output classification) and a set of input features that are used as predictors for the classes.

For the dialog categories described above, the dialog predictor 180 uses the classification model stored in the dialog training database 165 to predict/identify problematic dialogs. Therefore, the HANGUP, WIZARD and TASKFAILURE scenarios are treated as equivalently problematic. Thus, the classifier is trained to distinguish between two classes: TASKSUCCESS and PROBLEMATIC.

Note that the categorization and this context is inherently noisy because the real reason a caller hangs up or a wizard takes over a call it is not actually known. The caller may hang up because he or she is frustrated with the system, dislikes automation, or gets distracted. Similarly, one wizard may have low confidence in the system's ability to recover from errors and use a conservative approach that results in taking over many calls, while another wizard may be more willing to allow the system to attempt recovery.

Nevertheless these human actions are taken as a human labeling of these calls as problematic. Given this classification, experiments have shown that approximately 36% of the calls in the corpus of 4774 dialogs are PROBLEMATIC and 64% are TASKSUCCESS. Next, each dialog is encoded in terms of a set of 196 features that were either automatically logged by one of the system modules, hand-labeled by humans, or derived from raw features. Hand-labeled features are used to produce a TOPLINE, an estimation of how well the task classification processor 140 could do that had access to perfect information. The exemplary feature set is summarized below:

Recognizer Features
    recog, recog-numwords, ASR-duration, dtmf-flag, rg-modality, rg-grammar
Natural Language Understanding Features
    a confidence measure for all of the possible tasks that the user could be trying to do
    salience-coverage, inconsistency, context-shift, top-task, nexttop-task, top-confidence, diff-confidence
Dialog Manager Features
    sys-label, utt-id, prompt, reprompt, confirma-tion, subdial
    running tallies: num-reprompts, num-confirms, num-subdials, reprompt %, confirmation %, subdialog %
Hand-Labeled Features
    tscript, human-label, age, gender, user-modality, cleantscript, cltscript-numwords, rsuccess
Whole-Dialog Features
    num-utts, num-reprompts, percent-reprompts, num-confirms, percent-confirms, num-subdials, percent-subdials, dial-duration While this feature set is used to illustrate this example, the set is not limited to only those examples listed above. In the exemplary set, there are 8 features that describe the whole dialog, and 47 features for each of the first four exchanges. Features for the first four exchanges are encoded because the goal is to predict failures before they happen. Since 97% of the dialogs in the corpus are five exchanges or less, in most cases, any potential problematic outcome will have occurred by the time the system has participated in five exchanges. Because the dialog predictor 180 needs to be able to predict whether the dialog will be problematic using information it has available in the initial part of the dialog, the dialog predictor 180 is trained so that it has access to input features from exchange 1, or only the features from exchange 1 and exchange 2.

To see whether the results generalize, the experiment was also conducted with a subset of features that are task-independent. Results for predicting problematic dialogs are compared with results for identifying problematic dialogs, when the automated problematic dialog prediction system 100 had access to features representing the whole dialog.

Features logged by the system 100 are utilized because they are produced automatically, and thus could be used during runtime to alter the course of the dialog. Thus, dialog predictor 180 uses information collected from the recognizer 120, the NLU 130, and the dialog manager 190. The information and the features obtained are described below.

The recognizer 120 takes as input the acoustic and/or non-acoustic signals and outputs a potentially error-laden transcription of what it believes the user communicated to the NLU 130. The recognizer 120 features for each of the first four exchanges were the output of the recognizer (recog), the number of words in the recognizer output (recog-numwords), the duration in seconds of the input to the recognizer (asr-duration), a flag for touchtone input (dtmf-flag), the input modality expected by the recognizer (rg-modality) (one of: none, speech, touchtone, speech+touchtone, touchtone-card, speech+touchtone-card, touchtone-date, speech+touchtone-date, or none-final-prompt), and the grammar used by the recognizer (rg-gmmmar).

The motivation for the recognizer 120 features is that any one of them may have impacted performance. For example, it is well known that longer utterances are less likely to be recognized correctly, thus asr-duration could be a clue to incorrect recognition results. In addition, the larger the grammar is, the more likely a recognition error is, so the name of the grammar rg-grammar could be a predictor of incorrect recognition.

The NLU 130 takes as input a transcription of the user's utterance from recognizer 120 and produces 15 confidence scores, for example, representing the likelihood that the user's task is one of the 15 task types. It also extracts other relevant information, such as phone or credit card numbers. Thus, 15 of the NLU 130 features for each exchange represent the 15 confidence scores.

There are also features that the NLU 130 calculates based on processing the utterance. These include an intra-utterance measure of the inconsistency between tasks that the user appears to be requesting (inconsistency), a measure of the coverage of the utterance by salient grammar fragments (salience-coverage), a measure of the shift in context between utterances (context-shift), the task with the highest confidence score (top-task), the task with the second highest confidence score (nexttop-task), the value of the highest confidence score (top-confidence), and the difference in values between the top and next-to-top confidence scores (diff-confidence).

The motivation for these NLU 130 features is to make use of information that the NLU module has based on processing the output of recognizer 120 and the current discourse context. For example, for utterances that follow the first utterance, the NLU 130 knows what task it believes the user is trying to complete. If it appears that the user has changed his or her mind, then the NLU 130 may have misunderstood a previous utterance. The context-shift feature indicates the NLU 130 belief that it may have made (or is in the process of making) an error.

The dialog manager 190 takes the output of the NLU 130 and the dialog history and decides what it should say to the caller next. The dialog manager 190 decides whether it believes there is a single unambiguous task that the user is trying to accomplish, and how to resolve any ambiguity. The dialog manager 190 features for each of the first four exchanges are the task-type label that includes a label that indicates task ambiguity (sys-label), utterance id within the dialog (implicit in the encoding), the name of the prompt played before the user utterance (prompt), and whether that prompt was a reprompt (reprompt), a confirmation (confirm), or a subdialog prompt (subdial), a superset of the re-prompts and confirmation prompts.

The task-type label feature is to capture the fact that some tasks may be more difficult than others. The utterance id feature is motivated by the idea that the length of the dialog may be important, possibly in combination with other features like task-type. The different prompt features for initial prompts, reprompts, confirmation prompts and sub-dialog prompts are motivated by results indicating that reprompts and confirmation prompts are frustrating for callers and that callers are likely to hy-perarticulate when they have to repeat themselves, which results in recognition errors.

The dialog manager 190 features also include running tallies for the number of reprompts (num-reprompts), number of confirmation prompts (num-confirms), and number of sub-dialog prompts (num-subdials), that had been played up to each point in the dialog, as well as running percentages (percent-reprompts, percent-confirms, percent-subdials). The use of running tallies and percentages is based on the assumption that these features are likely to produce generalized predictors.

The features obtained via hand-labeling were human transcripts of each user utterance (tscript), a set of semantic labels that are closely related to the system task-type labels (human-label), age (age) and gender (gender) of the user, the actual modality of the user utterance (user-modality) (one of: nothing, speech, touchtone, speech+touchtone, non-speech), and a cleaned transcript with non-word noise information removed (clean-fscript).

From these features, two derived features were calculated. The first was the number of words in the cleaned transcript (cltscript, numwords), again on the assumption that utterance length is strongly correlated with recognition and understanding errors. The second derived feature was based on calculating whether the human-label matches the sys-label from the dialog manager (rsuccess). There were four values for rsuccess: rcorrect, rmismatch, rpartial-match and rvacuous-match, indicating respectively correct understanding, incorrect under-standing, partial understanding, and the fact that there had been no input for recognizer 120 and NLU 130 to operate on, either because the user didn't say anything or because he or she used touch-tone.

The whole-dialog features derived from the per utterance features were: num-utts, num-reprompts, percent-reprompts, num-confirms, percent-confirms, num-subdials, and percent-subdials for the whole dialog, and the duration of the entire dialog in seconds (dial-duration).

In the experiments, all of the features except the Hand-Labeled features are referred to as the AUTOMATIC feature set. The ability to identify or predict problematic dialogs is examined using these features, compared to the full feature set including the Hand-Labeled features. As discussed above, the dialog predictor 180 is generalized to other systems. Thus, how well problematic dialog can be predicted will be discussed using only features that are both automatically acquirable during runtime and independent of a task. The subset of features from the list above that fit this qualification are listed below. They are referred to as the AUTO, TASK-INDEP feature set.

Acoustic/ASR Features
    recog, recog-numwords, ASR-duration, dtmf-flag, rg-modality NLU Features
    salience-coverage, inconsistency, context-shift, top-confidence, diff-confidence Dialog Manager Features
　　utt-id, reprompt, confirmation, subdial
　　　running tallies: num-reprompts, num-confirms, num-subdials, reprompt %, confirmation %, subdia log %

The output is a classification model learned from the training data and stored in the dialog training database 165 for use by the dialog predictor 180. To evaluate these results, the error rates of the learned classification models are estimated using the re-sampling method of cross-validation. In 5-fold cross-validation, the total set of examples is randomly divided into 5 disjoint test sets, and 5 runs of the learning program are performed. Thus, each run uses the examples not in the test set for training and the remaining examples for testing. An estimated error rate is obtained by averaging the error rate on the testing portion of the data from each of the 5 runs.

Since the intention is to integrate the rules learned by the machine learning program into automated problematic dialog prediction system 100, the precision and recall performance of specific hypotheses is examined. Because hypotheses from different cross-validation experiments cannot readily be combined together, we apply the hypothesis learned on one randomly selected training set (80% of the data) to that set's respective test data. Thus, the precision and recall results reported below are somewhat less reliable than the error rates from cross-validation.

Figure 2:
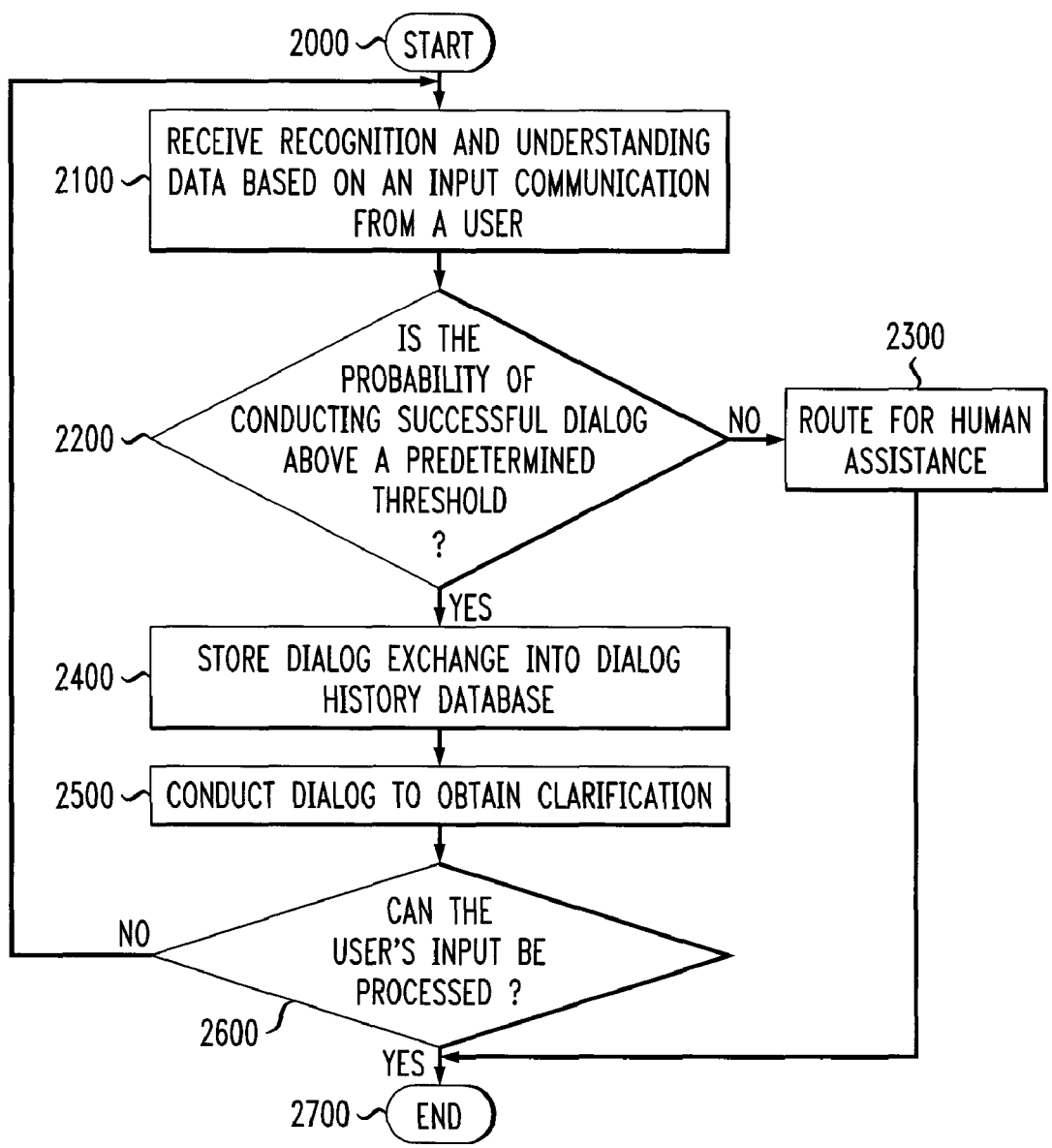
FIG. 2 is a flowchart illustrating an exemplary dialog prediction process.

FIG. 2 is a flowchart of an exemplary automatic dialog prediction process. The process begins its step 2000 and goes to step 2100 where the dialog predictor 180 receives recognition and understanding data from the recognizer 120 and the NLU 130, respectively, based on an input communication from a user. In step 2200, the dialog predictor 180 determines the probability of whether a successful dialog may be conducted with a user based on the initial dialog exchange data based on the recognition and understanding data received and the decision rules stored in the dialog training database 165.

If the probability determined by the dialog predictor 180 does not exceed a predetermined threshold, for example, the dialog predictor 180 signals the dialog manager 190 to route the user to a human for assistance. This situation may be represented by the following relationship:

$$t1 > P(\text{success})$$

If the probability determined by the dialog predictor 180 exceeds the predetermined threshold, for example, the dialog predictor 180 believes that continued dialog may be conducted with the user which may result in successfully routing and/or processing the user's input communication. This situation may be represented by the following relationship:

$$t1 < P(\text{success})$$

As result, the process moves to step 2400 where the dialog predictor 180 stores the dialog exchange into dialog history database 170.

In step 2500, the dialog manager 190 conducts further dialog with the user to obtain clarification of the users initial input communication (exchange 1). In step 2600, if the recognizer 120 and NLU 130 can recognize and understand the user's second input communication (exchange 2) so that it can be processed, the process goes to step 2700 and ends. However, if after exchange 2 the user's input communication cannot be processed, the process returns to step 2100 where the recognition and understanding data from the user's second input communication is input to the dialog predictor 180 by the recognizer 120 and the NLU 130. Then in step 2200, the dialog predictor determines whether successful dialog with the user may be conducted based on both the current exchange 2 and previous exchange 1 retrieved from the dialog history database 165. The process that continues as stated above.

Figure 3:
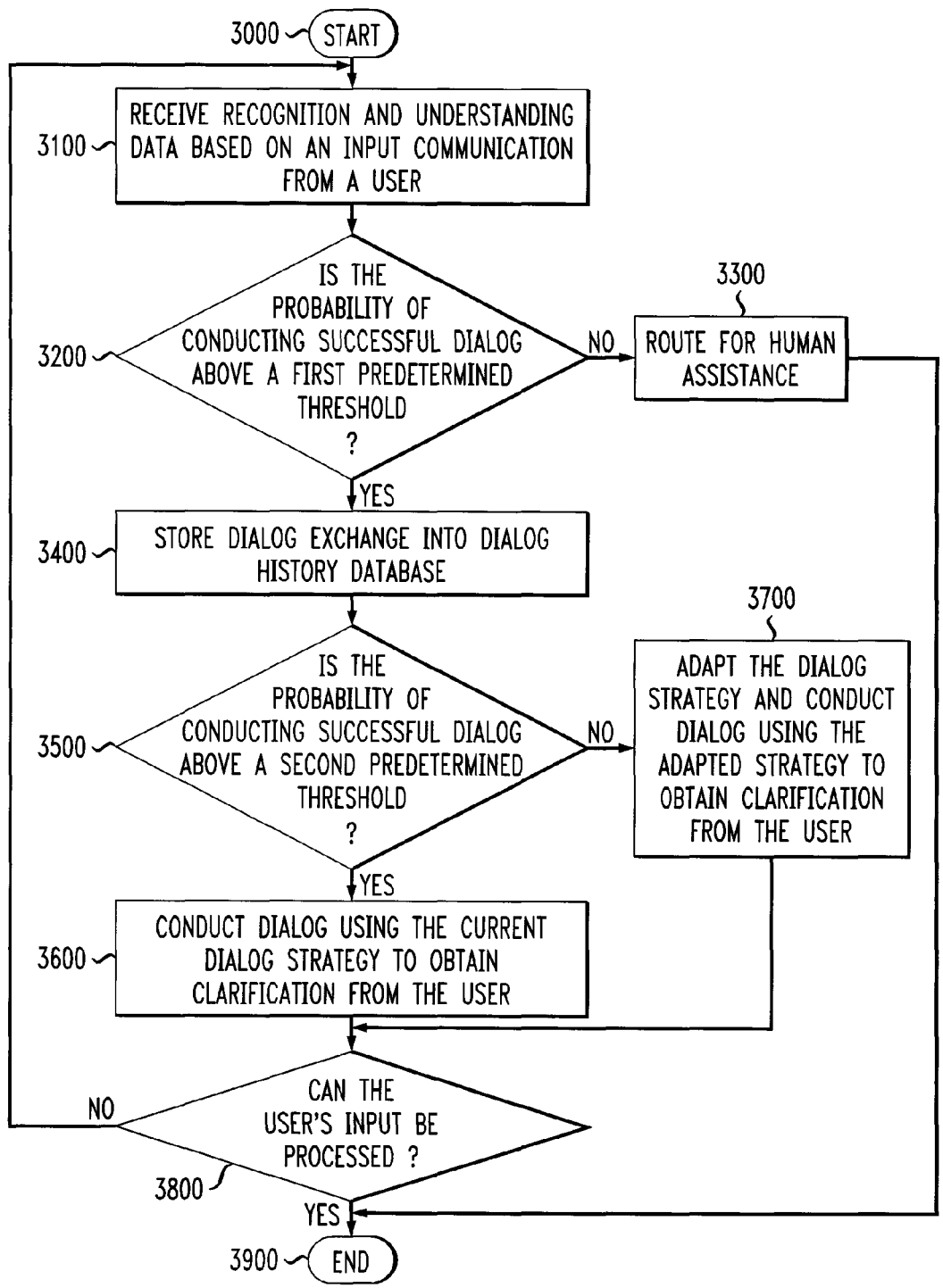
FIG. 3 is a flowchart illustrating another exemplary dialog prediction process using dialog strategy adaptation techniques.

FIG. 3 is a flowchart of an exemplary automatic dialog prediction process that allows the dialog strategy to be adapted between dialog exchanges. Steps 3000, 3100, 3200, 3300, and 3400, operate similarly to steps 2000, 2100, 2200, 2300, and 2400 of FIG. 2, respectively, and will not be further discussed.

However, after step 3400 in which the first dialog exchange is stored in the dialog history database 170, in step 3500, the dialog predictor 180 determines whether the probability of conducting a successful dialog with the user exceeds a second threshold. If the dialog predictor 180 determines that probability of conducting a successful dialog with the user exceeds the second threshold, in step 3600, the dialog manager 190 conducts dialog with the user using the current dialog strategy. This situation may be represented by the following relationship:

$$t1 < P(\text{success}) > t2$$

However, if the dialog predictor 180 determines that the probability of conducting a successful dialog with the user does not exceed the second threshold, in step 3700, the dialog manager 190 conducts dialog with the user using an adapted (or different) dialog strategy with the user. This situation may be represented by the following relationship:

$$t1 < P(\text{success}) < t2$$

The process then proceeds to step 3800, where determination is made whether the user's input communication can be processed based on either the current dialog strategy or the adapted dialog strategy opted for in step 3500. The process that continues similar to FIG. 2 above, and as such, will not be discussed further.

Figure 4:
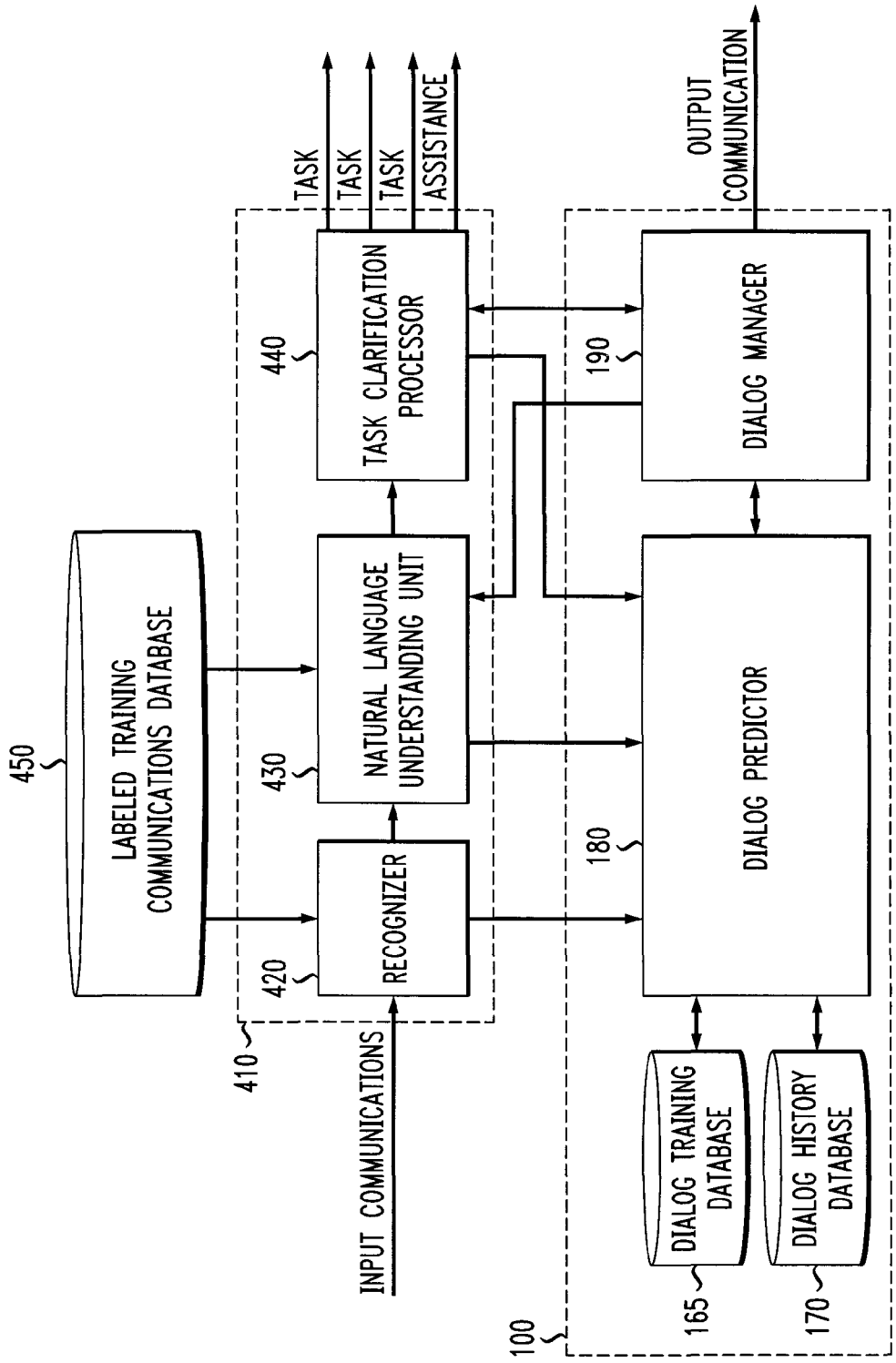
FIG. 4 is a block diagram of an exemplary task classification system using a dialog predictor.

FIG. 4 illustrates one possible application of the automated problematic dialog prediction system 100. In particular, FIG. 4 shows an exemplary automated task classification system 400 that conducts automated dialog with a user. The automated task classification system 400 includes a classification subsystem 410, a labeled training communications database 450 and an automated problematic dialog system 100. The classification subsystem 410 includes a recognizer 420, an NLU 430 and a task classification processor 440.

The automated problematic dialog system 100 includes a dialog predictor 180, a dialog manager 190, a dialog training database 165 and a dialog history database 170, as discussed above.

The automated task classification system 400 is based on the notion of task classification and routing. In the automated task classification system 400, services that the user can access are classified into a plurality of categories by a task classification processor or alternatively, to a category called other for calls that cannot be automated and must be transferred to a human operator. Each category describes a different task, such as person-to-person dialing, or receiving credit for a misdialed number. The task classification processor 440 determines which task the user is requesting on the basis of the NLU's 430 understanding of recognized language segments, stored in the labeled training communications database 450, and recognized by the recognizer 420. The NLU 430 attempts to interpret the user's response to, for example, the open-ended system greeting AT&T, How May I Help You? Once the response has been recognized and understood, task classification processor 440 determines the task, and the information needed for completing the caller's request is obtained using the dialog manager 190. The dialog manager 190 uses sub modules that are specific for each task.

Figure 5:
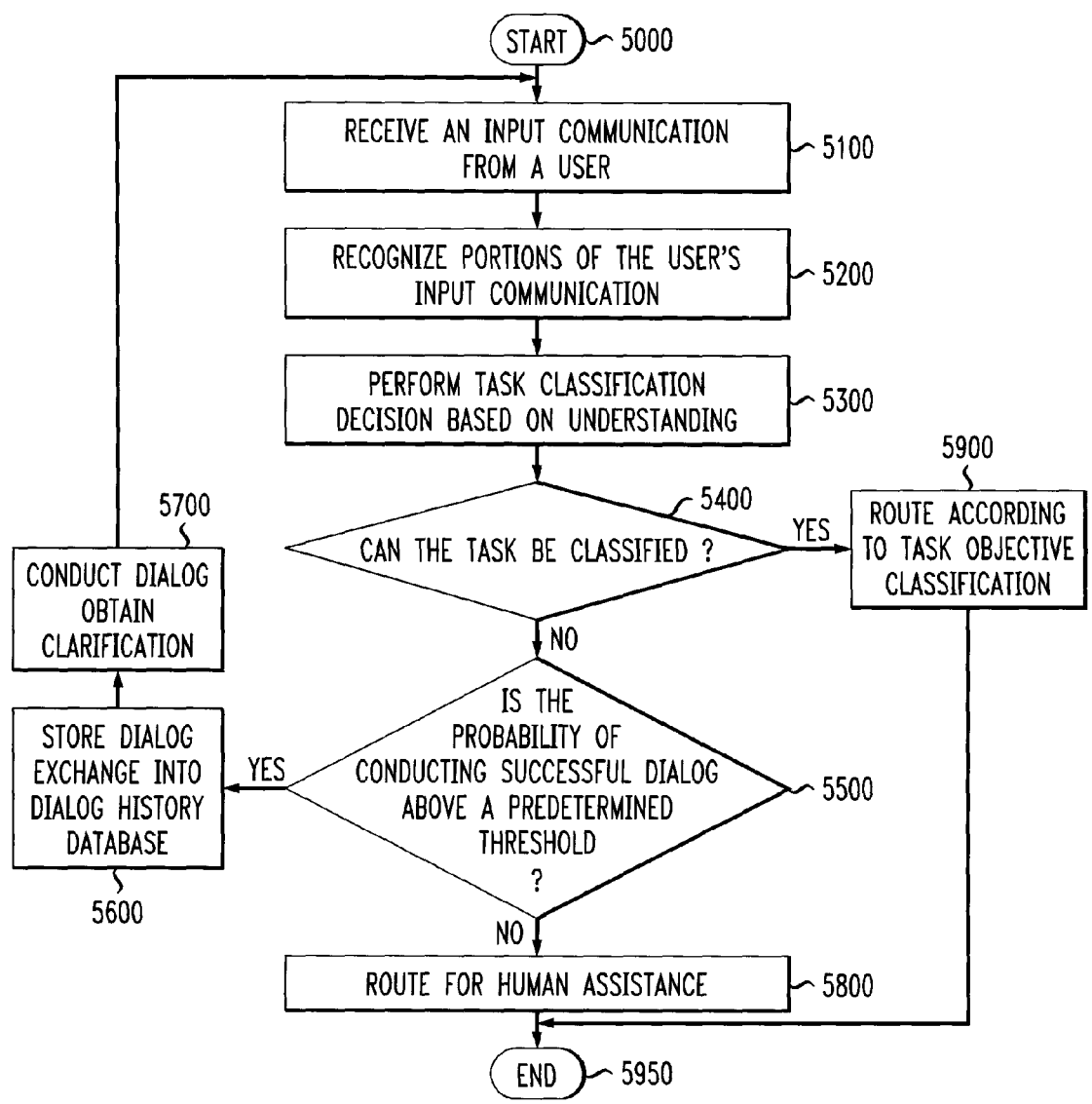
FIG. 5 is a flowchart illustrating an exemplary task classification process using a dialog prediction process.

FIG. 5 is a flowchart of a possible automated task classification process using the automated dialog prediction system 100 of the invention. Process begins its step 5000 in proceeds to step 5100 where an input communication is received by the recognizer 420. At step 5200, the recognizer attempts to recognize portions of the user's input communication, including grammar fragments, meaningful words/phrases/symbols, morphemes, actions, gestures, or any other communication signal.

At step 5300, the task classification processor 440 attempts to classify the user's request based on the understanding received from the NLU 430. In step 5400, the task classification processor 440 decides whether the task can be classified. If the task can be classified, then in step 5900, the task classification processor 440 routes the user's request according to the task classification, in the process proceeds to step 5950 and ends.

However, in step 5400, if it task classification processor 440 cannot classify the user's request in step 5500, the dialog predictor 180 determines whether the dialog manager's 190 probability of conducting a successful dialog exists above a predetermined threshold. In this iteration, the dialog predictor 180 is using only the first exchange (exchange 1). The dialog predictor 180 uses the classification model stored in the dialog training database 165 to determine if the probability of conducting a successful dialog exceeds the predetermined threshold. If the dialog predictor 180 determines that the probability of conducting a successful dialog does not exceed the threshold, then in step 5800 for user is routed to a human representative for assistance. The process then goes to step 5950 and ends.

If, in step 5500, the dialog predictor 180 determines that the probability of conducting a successful dialog is above the predetermined threshold based on the stored classification model, in step 5600 the first dialog exchange is stored in the dialog history database 170. Then, in step 5700, the dialog manager 190 conducts dialog with the user to obtain further clarification of user's request. The process returns to step 5200 wherein the recognizer 420 attempts to recognize portions of the second exchange with the user. Steps 5300 and 5400 are performed as before using the second exchange.

However, in step 5400, if the task classification processor 140 determines that the task cannot be classified, the dialog predictor 180 gauges the probability of conducting successful dialog above the predetermined threshold based on both exchange 2 and exchange 1 stored in the dialog history database 170. If the probability of conducting a successful dialog does not exceed the predetermined threshold based on exchanges 1 and 2, in step 5800, the task classification processor 440 is instructed by the dialog manager 190 to route the user to a human assistant. On the other hand, in step 5500, if the dialog predictor 180 determines that the probability of successful dialog exceeds the predetermined threshold, the second dialog exchange may be stored in step 5600 and further dialog conducted with the user in step 5700. The process would continue using the current and previous exchanges with the user until the task is completed or the user is routed to a human assistant.

Figure 6:
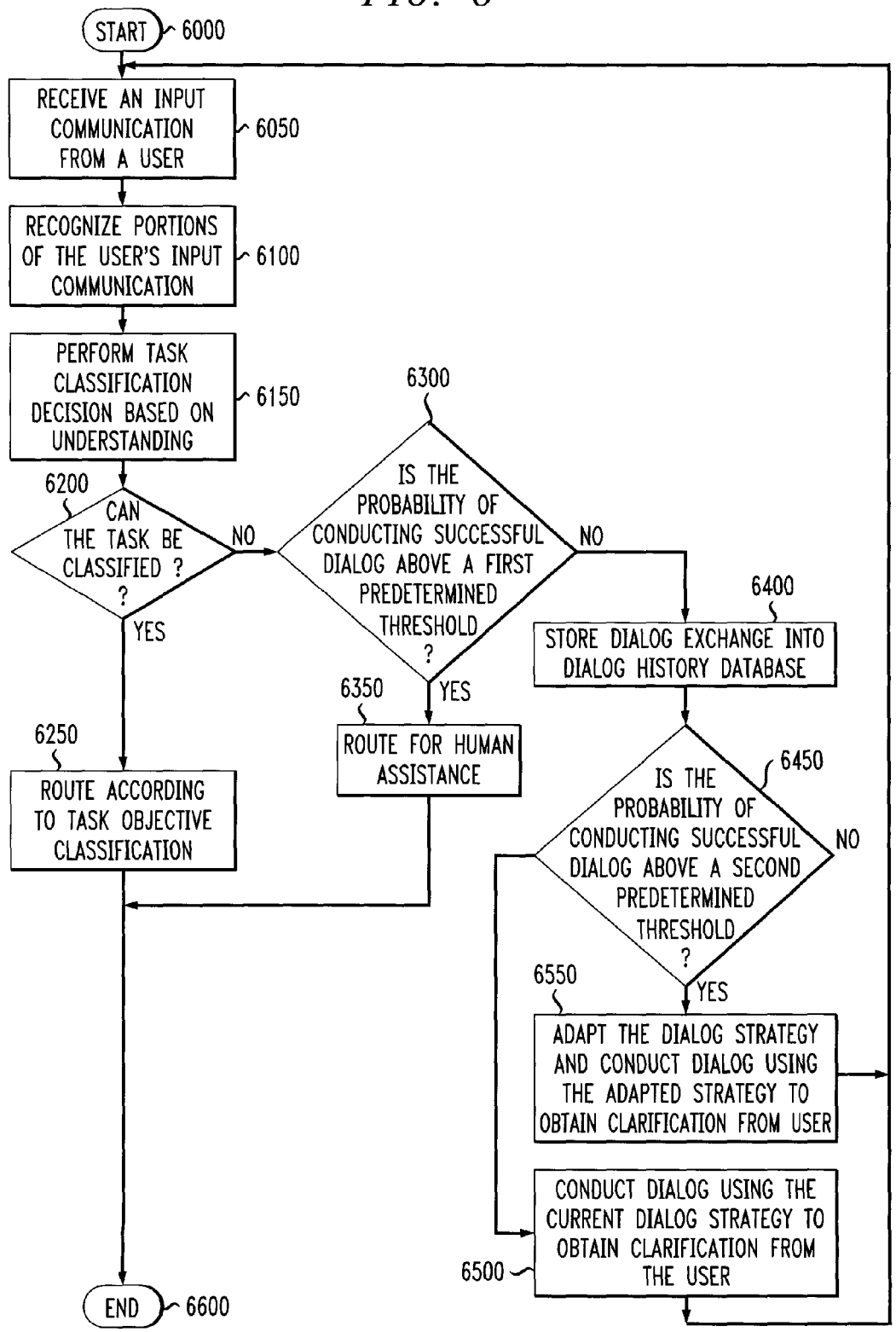
FIG. 6 is a flowchart illustrating an exemplary task classification process using a dialog prediction process having dialog strategy adaptation techniques.

FIG. 6 is a flowchart of a possible automated task classification process using the automated dialog prediction system 100 with the ability to adapt dialog strategy in an effort to conduct successful dialog with the user. Steps 6000, 6050, 6100, 6150, 6200, 6250, 6300, 6350, and 6400 operate similarly to steps 5000, 5100, 5200, 5300, 5400, 5900, 5500, 5800, and 5600 of FIG. 5, respectively, and will not be discussed further.

However, after step 6400 in which the first dialog exchange is stored in the dialog history database 170, in step 6450, the dialog predictor 180 determines whether the probability of conducting a successful dialog with the user exceeds a second threshold. If the dialog predictor 180 determines that probability of conducting a successful dialog with the user exceeds the second threshold, in step 6500, the dialog manager 190 conducts dialog with the user using the current dialog strategy.

However, if the dialog predictor 180 determines that the probability of conducting a successful dialog with the user does not exceed the second threshold, in step 6550, the dialog manager 190 conducts dialog with the user using an adapted (or different) dialog strategy with the user.

The process then proceeds to back to step 6050, where the recognizer 120 receives the user's input communication based on either the current dialog strategy or the adapted dialog strategy opted for in step 6450. The process that continues similar to FIG. 5 above, and as such, will not be discussed further.

FIG. 7 is a chart illustrating the results of experiments conducted using the automated problematic dialog prediction system 100 including the dialog predictor 180. The baseline on the first line of FIG. 7 represents the prediction accuracy from always guessing the majority class. Since 64% of the dialogs are TASKSUCCESS dialogs, we can achieve 64% accuracy from simply guessing TASKSUCCESS without having seen any of the dialog yet.

The first EXCHANGE 1 shows the results of using the AUTOMATIC features from only the first exchange to predict whether the dialog outcome will be TASKSUCCESS or PROBLEMATIC. The results showed that the machine-learned classifier can predict problematic dialogs 8% better than the baseline after having seen only the first user utterance. Using only task-independent automatic features the EXCHANGE 1 classifier can still do nearly as well. The ALL row for EXCHANGE 1 indicates that even if the system had access to human perceptual ability (the hand-labeled features) the system would only be able to distinguish between TASKSUCCESS and PROBLEMATIC dialogs with 77% accuracy after having seen the first exchange.

The EXCHANGE 1 & 2 rows of FIG. 7 show the results using features from the first two exchanges in the dialog to predict the outcome of the dialog. The additional change gives roughly an additional 7% boost in predictive accuracy using either of the automatic feature sets. This is only 8% less than the accuracy we can achieve using these features after having seen the whole dialog. The ALL row for EXCHANGE 1 & 2 shows that over 86% accuracy could be achieved if the system had the ability to utilize the hand-labeled features.

The FULL DIALOG row in FIG. 7 AUTOMATIC and AUTO, TASK-INDEP features show the ability of the dialog predictor 180 to identify problematic dialogs, rather than to predict them, using features for the whole dialog. The ALL row for the FULL DIALOG shows that over 92% of the outcomes could be correctly identified if the system had the ability to utilize the hand-labeled features.

As shown in FIGS. 1 and 4, the method of this invention may be implemented using one or more programmed processors. However, method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIGS. 2, 3, 5 and 6 can be used to implement the task classification system and dialog predictor functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method comprising:
conducting a dialog exchange between an automated dialog system and a user, the dialog exchange including at least two dialog system prompts and two user input opportunities; and
determining whether a probability threshold is exceeded that relates to a prediction that continuing the dialog exchange with the user will converge and succeed to a stage consistent with the user's intent or diverge and fail, wherein determining whether the probability threshold is exceeded is based, at least in part, training data on multiple dialog turns in a corpus of dialogs tagged for success or failure after at least two dialog prompts and two user inputs.

2. The method of claim 1, wherein the dialog training data includes at least one of dialog classification models and extracted dialog features.

3. The method of claim 2, wherein the extracted dialog features are derived from recognition, understanding and dialog data.

4. The method of claim 1, wherein if the probability threshold is exceeded, further dialog is conducted with the user.

5. The method of claim 1, wherein the probability threshold is a first threshold, the method further comprising:
determining whether a probability of conducting a successful dialog with the user exceeds a second threshold, the second threshold being greater than the probability threshold, wherein if the second threshold is exceeded, further dialog is conducted with the user using a current dialog strategy.

6. The method of claim 5, wherein if the second threshold is not exceeded, further dialog is conducted with the user using an adapted dialog strategy.

7. The method of claim 6, wherein the adapted dialog strategy includes one of prompting the user with choices and prompting the user to confirm recognition and understanding data.

8. The method of claim 1, wherein the user's input communication includes at least one of verbal and nonverbal communications.

9. The method of claim 8, wherein the nonverbal communications include at least one of gestures, body movements, head movements, non-responses, text, keyboard entries, keypad entries, mouse clicks, DTMF codes, pointers, stylus, cable set-top box entries, graphical user interface entries, and touchscreen entries.

10. The method of claim 1, wherein the method is used for customer care purposes.

11. The method of claim 1, wherein the probability is determined using recognition and understanding data derived from the user's input communication.

12. The method of claim 1, wherein if the probability threshold is not exceeded, the user is routed to a human for assistance.

13. The method of claim 1, wherein the dialog training data is stored in a dialog training database.

14. A system comprising:
a processor;
a module configured to control the processor to conduct a dialog exchange between an automated dialog system and a user, the dialog exchange including at least two dialog system prompts and two user input opportunities; and
a module configured to determine whether a probability threshold is exceeded that relates to a prediction that continuing the dialog exchange with the user will converge and succeed to a stage consistent with the user's intent or diverge and fail, wherein determining whether the probability threshold is exceeded is based, at least in part, training data on multiple dialog turns in a corpus of dialogs tagged for success or failure after at least two dialog prompts and two user inputs.

15. The system of claim 14, wherein the dialog training data includes at least one of dialog classification models and extracted dialog features.

16. The system of claim 14, wherein if the probability threshold is not exceeded, the user is routed to a human for assistance.

17. The system of claim 14, wherein if the probability threshold is succeeded, further dialog is conducted with the user.

18. The system of claim 14, wherein the probability threshold is a first threshold, the method further comprising:
determining whether a probability of conducting a successful dialog with the user exceeds a second threshold, the second threshold being greater than the probability threshold, wherein if the second threshold is exceeded, further dialog is conducted with the user using a current dialog strategy.

19. The system of claim 18, wherein if the second threshold is not exceeded, further dialog is conducted with the user using an adapted dialog strategy.

20. The system of claim 19, wherein the adapted dialog strategy includes one of prompting the user with choices and prompting the user to confirm recognition and understanding data.

21. The system of claim 14, wherein the user's input communication includes at least one of verbal and nonverbal communications.

22. The system of claim 21, wherein the nonverbal communications include at least one of gestures, body movements, head movements, non-responses, text, keyboard entries, keypad entries, mouse clicks, DTMF codes, pointers, stylus, cable set-top box entries, graphical user interface entries, and touchscreen entries.

* * * * *